US011462920B2

(12) United States Patent
Wang (10) Patent No.: US 11,462,920 B2
(45) Date of Patent: *Oct. 4, 2022

(54) METHOD AND SYSTEM FOR PRODUCING AN ACTIVE SHORT CIRCUIT CONDITION IN AN ELECTRIC MOTOR OF A HYBRID ELECTRIC VEHICLE

(71) Applicant: Lear Corporation, Southfield, MI (US)

(72) Inventor: Xiaoyan Wang, Troy, MI (US)

(73) Assignee: LEAR CORPORATION, Southfield, MI (US)

( * ) Notice: Subject to any disclaimer, the term of this patent is extended or adjusted under 35 U.S.C. 154(b) by 345 days.

This patent is subject to a terminal disclaimer.

(21) Appl. No.: 16/778,851

(22) Filed: Jan. 31, 2020

(65) Prior Publication Data

US 2021/0242705 A1 Aug. 5, 2021

(51) Int. Cl.
*H02J 7/00* (2006.01)
*B60K 6/28* (2007.10)
(Continued)

(52) U.S. Cl.
CPC ............ *H02J 7/00302* (2020.01); *B60K 6/24* (2013.01); *B60K 6/26* (2013.01); *B60K 6/28* (2013.01);
(Continued)

(58) Field of Classification Search
CPC ...... H02J 7/00302; H02P 27/06; B60L 53/60; B60L 15/20; B60K 6/24; B60K 6/26;
(Continued)

(56) References Cited

U.S. PATENT DOCUMENTS

| 5,929,578 A | 7/1999 | Atarashi |
| 6,422,331 B1 | 7/2002 | Ochiai et al. |
| (Continued) | | |

FOREIGN PATENT DOCUMENTS

| CN | 107976627 A | * | 5/2018 | ............. G01R 31/34 |
| DE | 102017119271 A1 | * | 2/2019 | ............. B60L 50/50 |
| (Continued) | | | | |

OTHER PUBLICATIONS

U.S. Appl. No. 16/778,842, Amendment Under 37 C.F.R. 1.111, dated Nov. 29, 2021, 11 pages.
(Continued)

*Primary Examiner* — Tisha D Lewis
(74) *Attorney, Agent, or Firm* — Brooks Kushman P.C.

(57) ABSTRACT

A system for producing an active short circuit in an electric motor of a hybrid electric vehicle having a traction battery includes an inverter to be provided in communication with the motor and battery, and an inverter controller to generate driver signals to operate inverter switches to produce three-phase AC for the motor or to produce DC for battery charging. In response to motor speed exceeding a threshold, the controller is configured to generate driver signals to operate the inverter switches to produce an active short circuit in the motor to prevent battery overcharging. A processor and electric circuit are each configured to independently generate an active short circuit control signal operative to effectuate generation of the driver signals, the active short circuit produced based on an active short circuit control signal from the electric circuit in an absence of an active short circuit control signal from the processor.

18 Claims, 3 Drawing Sheets

(51) Int. Cl.
  *B60L 53/60* (2019.01)
  *B60W 10/06* (2006.01)
  *B60W 10/08* (2006.01)
  *B60W 20/00* (2016.01)
  *B60L 15/20* (2006.01)
  *B60K 6/26* (2007.10)
  *B60K 6/24* (2007.10)
  *F02D 41/02* (2006.01)
  *H02P 27/06* (2006.01)
  *B60K 6/38* (2007.10)
  *B60K 6/44* (2007.10)
  *B60K 6/36* (2007.10)

(52) U.S. Cl.
  CPC ............ *B60L 15/20* (2013.01); *B60L 53/60* (2019.02); *B60W 10/06* (2013.01); *B60W 10/08* (2013.01); *B60W 20/00* (2013.01); *F02D 41/021* (2013.01); *H02P 27/06* (2013.01); *B60K 6/36* (2013.01); *B60K 6/38* (2013.01); *B60K 6/44* (2013.01); *B60W 2710/06* (2013.01); *B60W 2710/08* (2013.01); *B60Y 2200/92* (2013.01)

(58) Field of Classification Search
  CPC ... B60K 6/28; B60K 6/36; B60K 6/38; B60K 6/44; B60W 10/06; B60W 10/08; B60W 20/00; B60W 2710/06; B60W 2710/08; B60Y 2200/92; F02D 41/021
  See application file for complete search history.

(56) References Cited

U.S. PATENT DOCUMENTS

| | | | |
|---|---|---|---|
| 6,958,586 B2 | 10/2005 | Tanimoto | |
| 7,391,180 B2 | 6/2008 | Armiroli et al. | |
| 7,960,930 B2 | 6/2011 | Sato | |
| 8,207,692 B2 | 6/2012 | Holmberg et al. | |
| 8,594,873 B2 | 11/2013 | Kimura et al. | |
| 8,666,579 B2 | 3/2014 | Akutsu et al. | |
| 9,186,998 B2 | 11/2015 | Wald et al. | |
| 9,302,589 B2 | 4/2016 | Schneider et al. | |
| 9,438,157 B2 | 9/2016 | Adam et al. | |
| 9,621,099 B1 | 4/2017 | Namudur et al. | |
| 9,673,744 B2 | 6/2017 | Eberlein et al. | |
| 9,698,716 B2 | 7/2017 | Tobari et al. | |
| 10,295,414 B2 | 5/2019 | Karl | |
| 10,351,002 B2 | 7/2019 | Saha et al. | |
| 11,167,644 B2 * | 11/2021 | Wang | H02P 3/22 |
| 2005/0093496 A1 | 5/2005 | Tokunou et al. | |
| 2009/0121668 A1 | 5/2009 | West et al. | |
| 2015/0314685 A1 | 11/2015 | Imamura et al. | |
| 2015/0377162 A1 | 12/2015 | Kamioka et al. | |
| 2021/0237579 A1 | 8/2021 | Wang | |
| 2021/0237603 A1 | 8/2021 | Wang | |

FOREIGN PATENT DOCUMENTS

| | | |
|---|---|---|
| EP | 2727235 B1 | 3/2015 |
| EP | 2846454 A1 | 3/2015 |
| JP | 2006288051 A | 10/2006 |
| WO | 2018228741 A1 | 12/2018 |
| WO | 2019170495 A1 | 9/2019 |

OTHER PUBLICATIONS

U.S. Appl. No. 16/778,842, Notice of Allowance, dated Jun. 9, 2021, 12 pages.
U.S. Appl. No. 16/778,827, Notice of Allowance, dated Apr. 7, 2021, 14 pages.
U.S. Appl. No. 16/778,842, filed Jan. 31, 2020, 21 pages.
U.S. Appl. No. 16/778,827, filed Jan. 31, 2020, 21 pages.
Notice of Allowance and Fees Due for U.S. Appl. No. 16/778,827, dated Jan. 25, 2022.
Non-Final Rejection for U.S. Appl. No. 16/778,827, dated Sep. 7, 2021.
U.S. Appl. No. 16/778,827, Notice of Allowance, dated Jul. 21, 2021, 15 pages.
Corrected Notice of Allowability for U.S. Appl. No. 16/778,842, dated Apr. 19, 2022.

* cited by examiner

METHOD AND SYSTEM FOR PRODUCING AN ACTIVE SHORT CIRCUIT CONDITION IN AN ELECTRIC MOTOR OF A HYBRID ELECTRIC VEHICLE

TECHNICAL FIELD

The following relates to a method and system for producing an active short circuit condition in an electric motor of a hybrid electric vehicle including a traction battery.

BACKGROUND

A hybrid electric vehicle (HEV) includes an electric motor and a high-voltage (HV) (e.g., 48V, 300V) direct current (DC) traction battery to provide power for the electric motor to drive a propulsion system of the vehicle. An HEV also includes an inverter having multiple switches, such as Insulated-Gate Bipolar Transistors (IGBTs), in electrical communication with the electric motor and the HV DC traction battery, as well as an inverter controller in electrical communication with the inverter. The electric motor, inverter, and inverter controller are typically part of a Belt-integrated Starter Generator (BiSG) system in which the shaft of the electric motor is provided in mechanical communication with a shaft of an internal combustion engine of the vehicle through a belt.

The BiSG system is configured for operation in different modes, including a motoring mode in which the inverter controller may control the inverter to operate the electric motor as a starter to assist engine start during cranking of the internal combustion engine. In such a motoring mode, the inverter controller may alternatively operate the electric motor to drive the vehicle propulsion system. More specifically, in the motoring mode, the inverter controller is configured to generate driver signals to operate the inverter switches to convert direct current (DC) received from the HV DC traction battery into three-phase alternating current (AC) for the electric motor to drive the vehicle propulsion system.

The BiSG system is also configured for operation in a generating mode in which the inverter controller controls the inverter to operate the electric motor as a charger to provide current to the HV DC traction battery. More specifically, in the generating mode, the inverter controller is configured to generate driver signals to operate the inverter switches to convert three-phase alternating current (AC) received from the electric motor operating as a generator into direct current (DC) for charging the HV DC traction battery.

An active short circuit condition may be utilized as a safety method to prevent the HV DC traction battery from being damaged due to overcharging. More specifically, the inverter controller may be configured to produce an active short circuit in the electric motor when the speed of the electric motor becomes high enough to allow free-wheeling current flowing from the electric motor to the HV DC traction battery.

In that regard, the inverter controller typically includes a microprocessor having stored computer executable instructions (i.e., software) for producing such an active short circuit condition. Such instructions, when executed by the microprocessor, cause the inverter controller to generate driver signals to control the inverter switches to produce an active short circuit condition in the electric motor. If the microprocessor is not alive or active, such as due to a malfunction or fault condition in the microprocessor or due to an absence or lack of electrical power to the microprocessor, an active short circuit condition cannot be produced to prevent the HV DC traction battery from overcharging.

A need therefore exists for an improved method and system for producing an active short circuit condition in an electric motor of an HEV including a HV DC traction battery that would overcome such problems. Such an improved method and system would utilize and/or include an inverter controller further comprising hardware, such as an electric or electronic circuit or circuitry, configured to independently produce an active short circuit condition in the electric motor. Such an improved method and system would produce an active short circuit condition based on control by such hardware in the absence of control by the processor.

SUMMARY

According to one non-limiting exemplary embodiment described herein, a method is provided for producing an active short circuit condition in an electric motor of a hybrid electric vehicle including a traction battery, an inverter having a plurality of switches in electrical communication with the electric motor and the traction battery, and an inverter controller in electrical communication with the inverter and configured to generate driver signals to operate the plurality of switches of the inverter to produce three-phase alternating current for the electric motor to drive a vehicle propulsion system or to produce direct current for charging the traction battery. The method comprises comparing a monitored speed of the electric motor to a speed threshold. The method further comprises generating, in response to the monitored speed exceeding the threshold, driver signals to operate the plurality of switches to produce an active short circuit condition in the electric motor to prevent overcharging of the traction battery, wherein the inverter controller comprises a processor and an electric circuit each configured to independently generate an active short circuit control signal operative to effectuate generation of the driver signals for producing the active short circuit condition, and wherein and the active short circuit condition is produced based on an active short circuit control signal generated by the electric circuit in an absence of an active short circuit control signal generated by the processor.

According to another non-limiting exemplary embodiment described herein, a system is provided for producing an active short circuit condition in an electric motor of a hybrid electric vehicle including a traction battery. The system comprises an inverter comprising a plurality of switches, wherein the inverter is configured to be provided in electrical communication with the electric motor and the traction battery, and an inverter controller configured to be provided in electrical communication with the inverter and to generate driver signals to operate the plurality of switches of the inverter to produce three-phase alternating current for the electric motor to drive a vehicle propulsion system or to produce direct current for charging the traction battery. The inverter controller is configured compare a monitored speed of the electric motor to a speed threshold, and in response to the monitored speed exceeding the threshold, generate driver signals to operate the plurality of switches to produce an active short circuit condition in the electric motor to prevent overcharging of the traction battery. The inverter controller comprises a processor and an electric circuit each configured to independently generate an active short circuit control signal operative to effectuate generation of the driver signals for producing the active short circuit condition, and the active short circuit condition is produced based on an active short circuit control signal generated by the electric circuit in an absence of an active short circuit control signal generated by the processor.

According to still another non-limiting exemplary embodiment described herein, a non-transitory computer readable storage medium is provided having stored computer executable instructions for producing an active short circuit condition in an electric motor of a hybrid electric vehicle including a traction battery, an inverter having a plurality of switches in electrical communication with the electric motor and the traction battery, and an inverter controller in electrical communication with the inverter and configured to generate driver signals to operate the plurality of switches of the inverter to produce three-phase alternating current for the electric motor to drive the vehicle propulsion system or to produce direct current for charging the traction battery. Execution of the instructions causes the inverter controller to compare a monitored speed of the electric motor to a speed threshold, and generate, in response to the monitored speed exceeding the threshold, driver signals to operate the plurality of switches to produce an active short circuit condition in the electric motor to prevent overcharging of the traction battery, wherein the inverter controller comprises a processor and an electric circuit each configured to independently generate an active short circuit control signal operative to effectuate generation of the driver signals for producing the active short circuit condition, and wherein execution of the instructions causes the active short circuit condition to be produced based an active short circuit control signal generated by the electric circuit in an absence of an active short circuit control signal generated by the processor.

A detailed description of these and other non-limiting exemplary embodiments of a method and system for producing an active short circuit condition in an electric motor of a hybrid electric vehicle including a traction battery are set forth below together with the accompanying drawings.

DETAILED DESCRIPTION

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components, elements, features, items, members, parts, portions, or the like. Therefore, specific structural and functional details disclosed herein are not to be interpreted as limiting, but merely as a representative basis for teaching one skilled in the art.

With reference to the Figures, a more detailed description will be provided of non-limiting exemplary embodiments of method and system for producing an active short circuit condition in an electric motor of a hybrid electric vehicle including a traction battery. For ease of illustration and to facilitate understanding, like reference numerals have been used herein for like components and features throughout the drawings.

Figure 1:
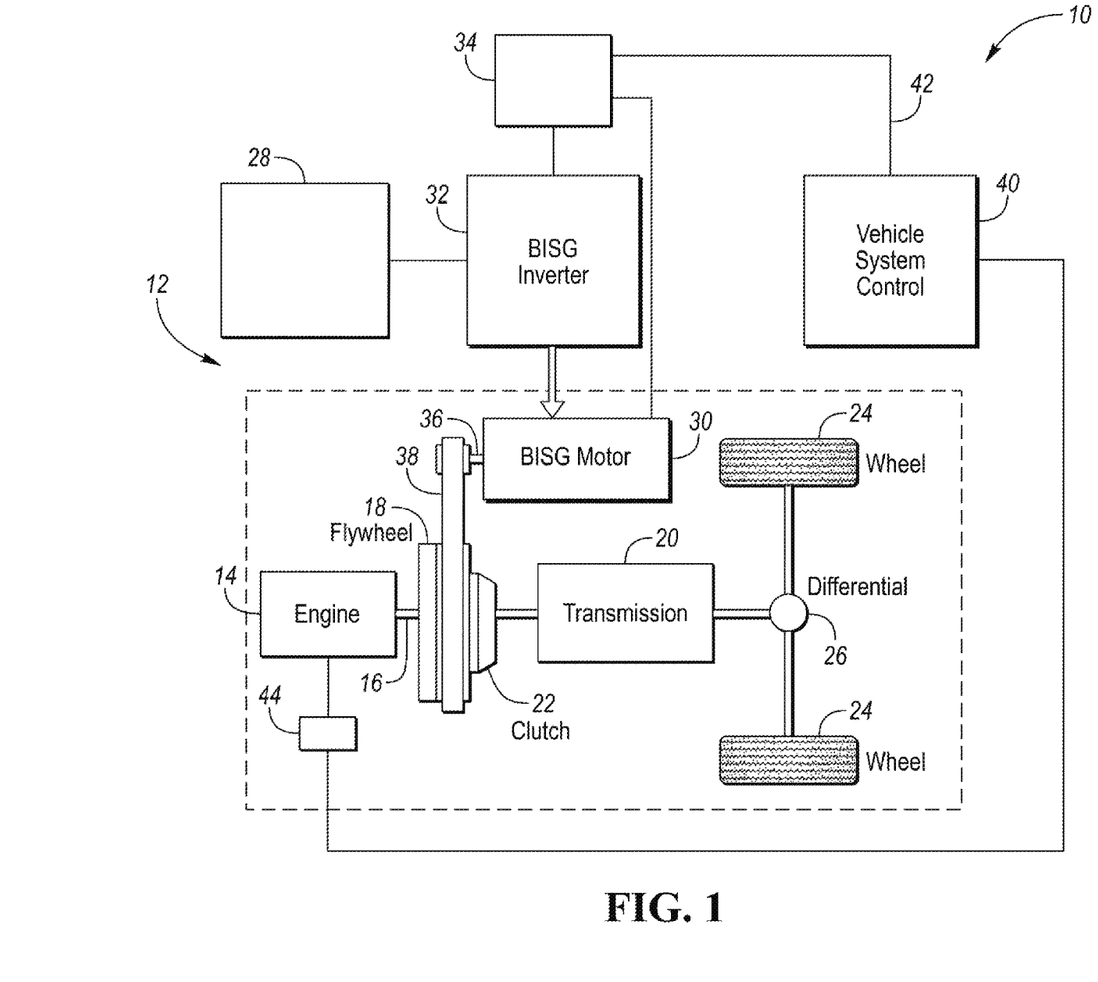
FIG. 1 is simplified block diagram of one non-limiting exemplary embodiment of a system for producing an active short circuit condition in an electric motor of a hybrid electric vehicle including a traction battery according to the present disclosure.

Referring now to FIG. 1, a simplified block diagram of one non-limiting exemplary embodiment of a system 10 for producing an active short circuit condition in an electric motor of a hybrid electric vehicle including a traction battery according to the present disclosure is shown. As seen therein, an HEV 12 may include an internal combustion engine (ICE) 14 having a shaft 16. The shaft 16 of the ICE 14 may be provided in mechanical communication with a flywheel 18, which in turn may be provided in mechanical communication with a vehicle transmission 20 through a clutch 22. The transmission 20 may be provided for driving drive wheels 24 through a differential 26.

The HEV 12 may also include a high-voltage (HV) direct current (DC) traction battery 28 and a Belt-integrated Starter Generator (BiSG) system. The BiSG system may comprise an electric motor 30, an inverter 32, and an inverter controller 34. The electric motor 30 may include a shaft 36 which may be configured for mechanical communication with the shaft 16 of the ICE 14 through a belt 38. The electric motor 30 may be further provided in electrical communication with the inverter 32, which itself may be provided in electrical communication with the inverter controller 34 and the HV DC traction battery 28. The inverter 32 may comprise multiple switches, such as Insulated-Gate Bipolar Transistors (IGBTs), which can be controlled to convert direct current (DC) supplied by the HV DC traction batter 28 into three-phase alternating current (AC) for powering the electric motor 30, or to convert three-phase AC generated by the electric motor 30 into DC for charging the HV DC traction battery 28. The inverter controller 34 may also be provided in electrical communication with vehicle system control, such as a vehicle controller 40. In that regard, electrical communication between the inverter controller 34 and the vehicle controller 40 may be provided over any suitable type of vehicle bus 42, such as a Flexray bus.

The BiSG system may be configured for operation in a motoring mode in which the inverter controller 34 may control the inverter 32 to operate the electric motor 30 as a starter to assist engine start during cranking of the ICE 14. In such a motoring mode, the inverter controller 34 may alternatively control the inverter 32 to operate the electric motor 30 to drive the vehicle propulsion system, including the vehicle transmission 20 and drive wheels 24. More specifically, in the motoring mode, the inverter controller 34 may be configured to generate driver signals to operate the switches of the inverter 32 to convert direct current (DC) received from the HV DC traction battery 28 into three-phase alternating current (AC) for powering the electric motor 30 to drive the vehicle propulsion system, including the vehicle transmission 20 and drive wheels 24.

The BiSG system may also be configured for operation in a generating mode in which the inverter controller 34 may control the inverter 32 to operate the electric motor 30 as a charger to provide DC current to the HV DC traction battery 28. More specifically, in the generating mode, the inverter controller 34 may be configured to generate driver signals to operate the switches of the inverter 32 to convert three-phase alternating current (AC) received from the electric motor 30 operating as a generator into direct current (DC) for charging the HV DC traction battery 28.

An active short circuit condition may be utilized as a safety method to prevent the HV DC traction battery 28 from being damaged due to overcharging. More specifically, the inverter controller 34 may be configured to produce an active short circuit in the electric motor 30 when the speed of the electric motor 30 becomes high enough to allow free-wheeling current flowing from the electric motor 30 to the HV DC traction battery 28.

In that regard, the inverter controller typically includes a microprocessor having stored computer executable instructions (i.e., software) for producing such an active short circuit condition. Such instructions, when executed by the microprocessor, cause the inverter controller to generate driver signals to control the inverter switches to produce an active short circuit condition in the electric motor. If the microprocessor is not alive or active, such as due to a malfunction or fault condition in the microprocessor or due to an absence or lack of electrical power to the microprocessor, an active short circuit condition cannot be produced to prevent the HV DC traction battery from overcharging.

As previously described, a need therefore exists for an improved method and system for producing an active short circuit condition in an electric motor of an HEV including a HV DC traction battery that would overcome such problems. Such an improved method and system would utilize and/or include an inverter controller further comprising hardware, such as an electric or electronic circuit or circuitry, configured to independently produce an active short circuit condition in the electric motor. Such an improved method and system would produce an active short circuit condition based on control by such hardware in the absence of control by the processor.

Still referring to FIG. 1, the system 10 of the present disclosure is provided for producing an active short circuit condition in the electric motor 30 of the HEV 12 that includes HV DC traction battery 28. As seen therein, the system may comprise an inverter 32 which may comprise a plurality of switches (not shown), such as Insulated-Gate Bipolar Transistors (IGBTs). The inverter 32 may be configured to be provided in electrical communication with the electric motor 30 and the HV DC traction battery 28. The system 10 may further comprise an inverter controller 34 which may be configured to be provided in electrical communication with the inverter 32 and to generate driver signals to operate the plurality of switches of the inverter 32 to produce three-phase alternating current (AC) for the electric motor 30 to drive the vehicle propulsion system or to generate driver signals to operate the plurality of switches of the inverter 32 to produce direct current (DC) for charging the HV DC traction battery 28.

The inverter controller 34 may be configured to monitor a speed of the electric motor 30 and/or compare a monitored speed of the electric motor 30 to an electric motor speed threshold. In response to the monitored speed of the electric motor 30 exceeding the electric motor speed threshold, the inverter controller 34 may be further configured to generate driver signals 60 (see FIG. 2) to operate the plurality of switches of the inverter 32 to produce an active short circuit condition in the electric motor 30 to prevent overcharging of the HV DC traction battery 28. In one non-limiting exemplary embodiment, the inverter 32 may comprise a three-phase inverter, and the inverter controller 34 may be configured to generate driver signals 60 such that, wherein, or whereby three low side switches, e.g., IGBTs, of the three-phase inverter 32 are turned ON and three high side switches, e.g., IGBTs, of the three-phase inverter 32 are turned OFF. In that regard, each driver signals 60 may comprise one or more pulse width modulated (PWM) signal to operate the switches of the inverter 32 to produce the active short circuit condition in the electric motor 30.

Figure 2:
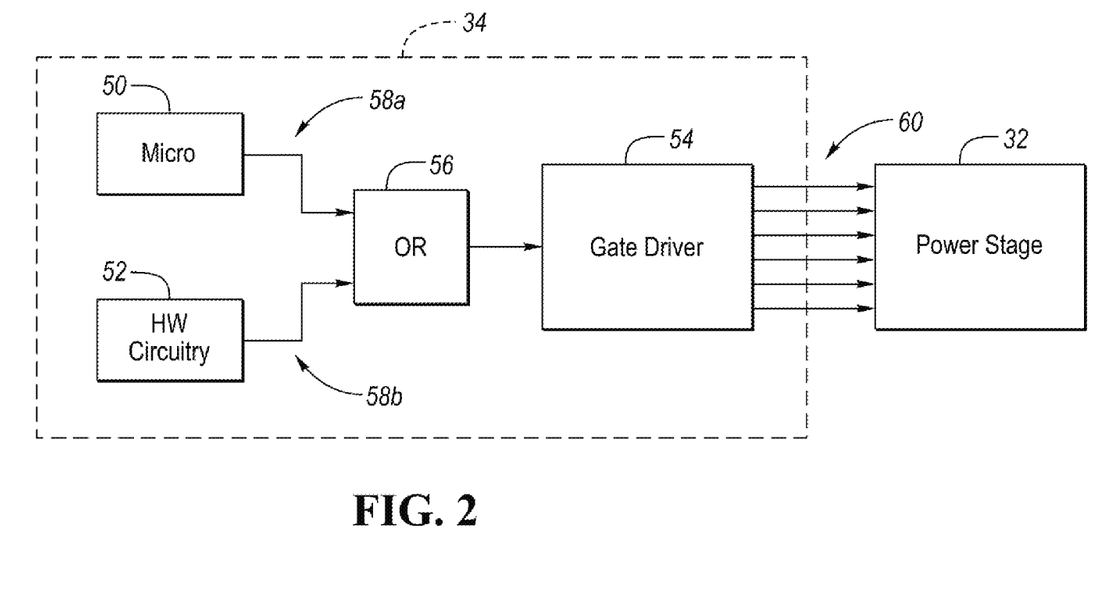
FIG. 2 is a simplified block diagram of one non-limiting exemplary embodiment of an inverter controller for producing an active short circuit condition in an electric motor of a hybrid electric vehicle including a traction battery according to the present disclosure.

Referring next to FIG. 2, a simplified block diagram of one non-limiting exemplary embodiment of an inverter controller 34 for producing an active short circuit condition in an electric motor 30 of an HEV 12 including a traction battery 28 according to the present disclosure is shown. As seen therein, and with continuing reference to FIG. 1, the inverter controller 34 may comprise a processor 50 and hardware circuitry such as an electric or electronic circuit 52. The inverter controller 34 may further comprise a gate driver 54 which may be provided in electrical communication with the processor 50 and the electric circuit 52 through a logical OR gate 56.

Each of the processor 50 and the electric circuit 52 may be configured to independently produce or generate active short circuit control signals 58*a*, 58*b* operative to effectuate generation of driver signals 60 to operate the switches of an inverter 32 to produce an active short circuit condition in an electric motor 30. The active short circuit control signal 58*a* may comprise one or more signals, such as for example one or more pulse width modulated (PWM) signals, produced or generated by the processor 50 based on execution of suitable stored computer executable instructions, independent of any active short circuit control signal 58*b* that may be produced or generated by the electric circuit 52. Similarly, the active short circuit control signal 58*b* may likewise comprise one or more signals, such as for example one or more PWM signals, produced or generated directly by the electric circuit 52, independent of any active short circuit control signal 58*a* which may be produced or generated by the processor 50. In that regard, the electric circuit may be configured in any known fashion to produce or generate an active short circuit signal 58*b*.

In such a fashion, the processor 50 and the electric circuit 52 may be configured to independently effectuate generation of the driver signals 60 by generating one or more active short circuit control signals 58*a*, 58*b* operative to command and/or control the gate driver 54 to generate the driver signals 60 to operate the switches of the inverter 32 to produce the active short circuit condition in the electric motor 30. In that regard, as a result of the connection of the processor 50 and the electric circuit 52 with the gate driver 54 through the logical OR gate 56, an active short circuit condition may be produced in the electric motor 30 based on driver signals 60 generated by the gate driver 54 in response to an active short circuit control signal 58*b* received from the electric circuit 52 in an absence of an active short circuit control signal 58*a* generated by the processor 50. Thus, the inverter controller 34 may comprise the gate driver 54, which may be configured to generate the driver signals 60 in response to receipt of an active short circuit control signal 58*a*, 58*b* from the processor 50 or the electric circuit 52.

Referring again to FIG. 1, in response to an active short circuit condition in the electric motor 30, the inverter controller 34 may be further configured to transmit an active short circuit notification signal to the vehicle controller 40, which may be configured to generate a control signal operative to stop the ICE 14 provided in mechanical communication with the electric motor 30 and thereby reduce circulation of electric current between the inverter 32 and the electric motor 30 caused by the active short circuit condition. The system 10 may also comprise the vehicle controller 40, which may be provided in electrical communication with the engine controller 44. The engine controller 44 may be configured to stop the ICE 14 in response to receipt of the engine stop control signal from the vehicle controller 40. The vehicle controller 40 may be configured to generate the engine stop control signal a predetermined period of time after receipt of the active short circuit notification signal, and the predetermined period of time may be based one or more parameters which may comprise a traction battery parameter, an electric motor parameter, and/or an inverter parameter. In that regard, such an active short circuit notification signal is described in detail in co-pending U.S. patent application Ser. No. 16/778,827, now U.S. patent Ser. No. 11/167,644, entitled "Method And System For Notification Of An Active Short Circuit Condition In An Electric Motor Of A Hybrid Electric Vehicle", filed on Jan. 31, 2020, the disclosure of which is hereby incorporated herein by reference in its entirety.

As previously described, the electric motor 30 may comprise a motor shaft 36 configured for mechanical communication with the shaft 16 of the ICE 14 through a belt 38. Moreover, the motor speed threshold to which the inverter controller 34 compares the monitored speed of the electric motor 30 may be a fixed value. Alternatively, the motor speed threshold may comprise a variable speed threshold, which may be proportional to a voltage of the HV DC traction battery 28. In that regard, such a variable speed threshold is described in detail in co-pending U.S. patent application Ser. No. 16/778,842, now U.S. Pat. No. 11,332,029, entitled "Method And System For Producing An Active Short Circuit Condition In An Electric Motor Of A Hybrid Electric Vehicle", filed on Jan. 31, 2020, the disclosure of which is hereby incorporated herein by reference in its entirety.

Figure 3:
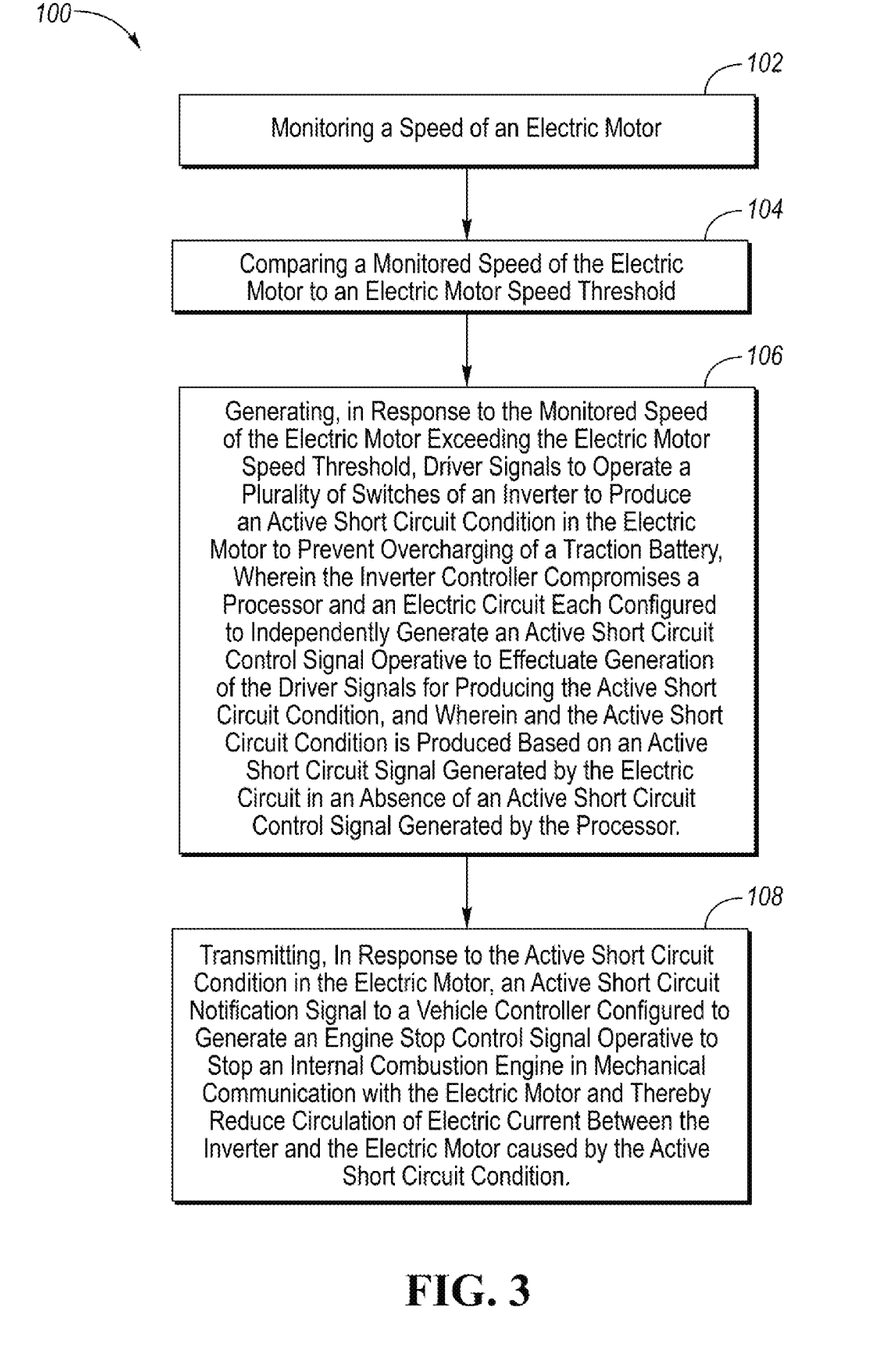
FIG. 3 is a simplified flowchart of one non-limiting exemplary embodiment of a method for producing an active short circuit condition in an electric motor of a hybrid electric vehicle including a traction battery according to the present disclosure.

Referring next to FIG. 3, a simplified flowchart of one non-limiting exemplary embodiment of a method for producing an active short circuit condition in an electric motor of a hybrid electric vehicle including a traction battery according to the present disclosure. As seen therein, and with continuing reference to FIGS. 1 and 2, the method 100 is provided for producing an active short circuit condition in an electric motor 30 of an HEV 12 including a traction battery 28, an inverter 32 having a plurality of switches in electrical communication with the electric motor 30 and the traction battery 28, and an inverter controller 34 in electrical communication with the inverter 32 and configured to generate driver signals 60 to operate the plurality of switches of the inverter 32 to produce three-phase AC for the electric motor 30 to drive the vehicle propulsion system or to produce DC for charging the traction battery 28.

The method 100 may comprise monitoring 102, such as by the inverter controller 34, a speed of the electric motor 30 and/or comparing 104, such as by the inverter controller 34, a monitored speed of the electric motor 30 to an electric motor speed threshold. The method 100 may further comprise generating 106, such as by the inverter controller 34, in response to the monitored speed exceeding the threshold, driver signals to operate the plurality of switches of the inverter 32 to produce an active short circuit condition in the electric motor 30 to prevent overcharging of the traction battery 28. In that regard, the inverter controller 34 may comprise a processor 50 and an electric circuit 52 each configured to independently generate an active short circuit control signal 58a, 58b operative to effectuate generation of the driver signals 60 for producing the active short circuit condition in the electric motor 30, and the active short circuit condition may be produced based an active short circuit control signal 58b generated by the electric circuit 52 in an absence of an active short circuit control signal 58a generated by the processor 50.

The method 100 may further comprise transmitting 108, such as by the inverter controller 34, in response to an active short circuit condition in the electric motor 30, an active short circuit notification signal to the vehicle controller 40 configured to generate an engine stop control signal in response to receipt of the active short circuit notification signal to stop the ICE 14 provided in mechanical communication with the electric motor 30 and thereby reduce circulation of electric current between the inverter 32 and the electric motor 30 caused by the active short circuit condition. As previously described, transmitting 108 the active short circuit notification signal may be performed a predetermined period of time after receipt of the active short circuit notification signal, and the predetermined period of time may be based on one or more of a plurality of parameters which may comprise a traction battery parameter, an electric motor parameter, and/or an inverter parameter.

As also described previously, the electric motor 30 may comprise a motor shaft 36 configured for mechanical communication with a shaft of the ICE 14 through the belt 38. Moreover, the electric motor speed threshold to which the monitored speed of the electric motor 30 is compared may comprise a variable speed threshold, which may be proportional to a voltage of the HV DC traction battery 28.

Still further, with continuing reference to FIGS. 1-3, the system 10 and method 100 of the present disclosure may be implemented utilizing a non-transitory computer readable storage medium having stored computer executable instructions for producing an active short circuit condition in an electric motor 30 of an HEV 12 including an HV DC traction battery 28, an inverter 34 having a plurality of switches in electrical communication with the electric motor 38 and the HV DC traction battery 28, and an inverter controller 34 in electrical communication with the inverter 32 and configured to generate driver signals to operate the plurality of switches of the inverter 32 to produce three-phase AC for the electric motor 30 to drive a vehicle propulsion system or to produce DC for charging the HV DC traction battery 28.

Execution of the stored computer executable instructions may cause the inverter controller 34 to monitor a speed of the electric motor 30 and/or compare a monitored speed of the electric motor 30 to a speed threshold. Execution of the stored computer executable instructions may further cause the inverter controller 34 to generate, in response to the monitored speed exceeding the threshold, driver signals 60 to operate the plurality of switches of the inverter 32 to produce an active short circuit condition in the electric motor 30 to prevent overcharging of the HV DC traction battery 28. In that regard, the inverter controller 34 may comprise a processor 50 and an electric circuit 52 each configured to independently generate an active short circuit control signal 58a, 58b operative to effectuate generation of the driver signals 60 for producing the active short circuit condition in the electric motor 30. Execution of the stored computer executable instructions may further cause the active short circuit condition to be produced based on an active short circuit control signal 58b generated by the electric circuit 52 in an absence of an active short circuit control signal 58b generated by the processor 50.

Execution of the stored computer executable instructions may further cause the inverter controller 32 to transmit, in response to an active short circuit condition in the electric motor 30, an active short circuit notification signal to the vehicle controller 40 which may be configured to generate an engine stop control signal in response to receipt of the active short circuit notification signal to stop the ICE 14 and thereby reduce circulation of electric current between the inverter 32 and the electric motor 30 caused by the active short circuit condition. In that regard, as described previously, the engine stop signal may be generated a predetermined period of time after the active short circuit notification signal, and the predetermined period of time may be based on one or more parameters which may comprise a traction battery parameter, an electric motor parameter, and/or an inverter parameter.

As previously described, the electric motor 30 may comprise a motor shaft 36 configured for mechanical communication with a shaft of the ICE 14 through the belt 38. Moreover, the electric motor speed threshold to which the monitored speed of the electric motor 30 is compared may comprise a variable speed threshold, which may be proportional to a voltage of the HV DC traction battery 28.

It should be noted that the inverter controller 34, the vehicle controller 40, the engine controller 44, the processor 50 and/or any other unit, module, controller, system, subsystem, mechanism, device, component or the like described herein may comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several such processors and/or circuitry and/or hardware may be distributed among several separate units, modules, controllers, systems, subsystems, mechanisms, devices, components or the like, whether individually packaged or assembled into a SoC (System-on-a-Chip).

As is readily apparent from the foregoing, various non-limiting exemplary embodiments of an improved system 10 and method 100 for producing an active short circuit condition in an electric motor 30 of an HEV 12 that includes an HV DC traction battery 28 have been described. Such an improved system 10 and method 100 utilize and/or include an inverter controller 34 further comprising hardware, such as an electric or electronic circuit or circuitry 52, configured to independently produce an active short circuit condition in the electric motor 30. Such an improved system 10 and method 100 produce an active short circuit condition based on control by such hardware in the absence of control by a processor.

While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A method for producing an active short circuit condition in an electric motor of a hybrid electric vehicle including a traction battery, an inverter having a plurality of switches in electrical communication with the electric motor and the traction battery, and an inverter controller in electrical communication with the inverter and configured to generate driver signals to operate the plurality of switches of the inverter to produce three-phase alternating current for the electric motor to drive a vehicle propulsion system or to produce direct current for charging the traction battery, the method comprising:
   comparing a monitored speed of the electric motor to a speed threshold;
   generating, in response to the monitored speed exceeding the threshold, driver signals to operate the plurality of switches to produce an active short circuit condition in the electric motor to prevent overcharging of the traction battery, wherein the inverter controller comprises a processor and an electric circuit each configured to independently generate an active short circuit control signal operative to effectuate generation of the driver signals for producing the active short circuit condition, and wherein and the active short circuit condition is produced based on an active short circuit control signal generated by the electric circuit in an absence of an active short circuit control signal generated by the processor; and
   transmitting, by the inverter controller, in response to an active short circuit condition in the electric motor, an active short circuit notification signal to a vehicle controller configured to generate an engine stop control signal a predetermined period of time after receipt of the active short circuit notification signal to stop an internal combustion engine in mechanical communication with the electric motor and thereby reduce circulation of electric current between the inverter and the electric motor caused by the active short circuit condition.

2. The method of claim 1 wherein the predetermined period of time is based on a plurality of parameters comprising an electric motor parameter and an inverter parameter.

3. The method of claim 1 wherein the electric motor comprises a motor shaft configured for mechanical communication with a shaft of the internal combustion engine through a belt.

4. The method of claim 1 wherein the speed threshold comprises a variable speed threshold proportional to a voltage of the traction battery.

5. The method of claim 1 wherein comparing the monitored speed of the electric motor to a speed threshold and generating the driver signals is performed by the inverter controller.

6. A system for producing an active short circuit condition in an electric motor of a hybrid electric vehicle including a traction battery, the system comprising:
   an inverter comprising a plurality of switches, wherein the inverter is configured to be provided in electrical communication with the electric motor and the traction battery; and
   an inverter controller configured to be provided in electrical communication with the inverter and to generate driver signals to operate the plurality of switches of the inverter to produce three-phase alternating current for the electric motor to drive a vehicle propulsion system or to produce direct current for charging the traction battery;
   wherein the inverter controller is configured to compare a monitored speed of the electric motor to a speed threshold, and in response to the monitored speed exceeding the threshold, generate driver signals to operate the plurality of switches to produce an active short circuit condition in the electric motor to prevent overcharging of the traction battery;

wherein the inverter controller comprises a processor and an electric circuit each configured to independently generate an active short circuit control signal operative to effectuate generation of the driver signals for producing the active short circuit condition, and wherein the active short circuit condition is produced based on an active short circuit control signal generated by the electric circuit in an absence of an active short circuit control signal generated by the processor;

wherein the inverter controller is further configured to transmit an active short circuit notification signal to a vehicle controller configured to generate an engine stop control signal a predetermined period of time after receipt of the active short circuit notification signal to stop an internal combustion engine of the vehicle and thereby reduce circulation of electric current between the inverter and the electric motor caused by the active short circuit condition.

7. The system of claim 6 wherein the predetermined period of time is based on a plurality of parameters comprising an electric motor parameter and an inverter parameter.

8. The system of claim 6 further comprising the vehicle controller.

9. The system of claim 6 wherein the vehicle controller is provided in electrical communication with an engine controller configured to stop the internal combustion engine in response to receipt of the engine stop control signal from the vehicle controller.

10. The system of claim 6 wherein the inverter controller further comprises a gate driver configured to generate the driver signals in response to receipt of an active short circuit control signal from the processor or the electric circuit.

11. The system of claim 7 wherein the electric motor comprises a motor shaft configured for mechanical communication with a shaft of the internal combustion engine through a belt.

12. The system of claim 6 wherein the speed threshold comprises a variable speed threshold.

13. The system of claim 12 wherein the variable speed threshold is proportional to a voltage of the traction battery.

14. A non-transitory computer readable storage medium having stored computer executable instructions for producing an active short circuit condition in an electric motor of a hybrid electric vehicle including a traction battery, an inverter having a plurality of switches in electrical communication with the electric motor and the traction battery, and an inverter controller in electrical communication with the inverter and configured to generate driver signals to operate the plurality of switches of the inverter to produce three-phase alternating current for the electric motor to drive a vehicle propulsion system or to produce direct current for charging the traction battery, wherein execution of the instructions causes the inverter controller to:

compare a monitored speed of the electric motor to a speed threshold;

generate, in response to the monitored speed exceeding the threshold, driver signals to operate the plurality of switches to produce an active short circuit condition in the electric motor to prevent overcharging of the traction battery, wherein the inverter controller comprises a processor and an electric circuit each configured to independently generate an active short circuit control signal operative to effectuate generation of the driver signals for producing the active short circuit condition, and wherein execution of the instructions causes the active short circuit condition to be produced based on an active short circuit control signal generated by the electric circuit in an absence of an active short circuit control signal generated by the processor; and transmit, in response to an active short circuit condition in the electric motor, an active short circuit notification signal to a vehicle controller configured to generate an engine stop control signal a predetermined period of time after receipt of the active short circuit notification signal to stop an internal combustion engine and thereby reduce circulation of electric current between the inverter and the electric motor caused by the active short circuit condition.

15. The non-transitory computer readable storage medium of claim 14 wherein the predetermined period of time is based on a plurality of parameters comprising an electric motor parameter and an inverter parameter.

16. The non-transitory computer readable storage medium of claim 14 wherein the electric motor comprises a motor shaft configured for mechanical communication with a shaft of the internal combustion engine through a belt.

17. The non-transitory computer readable storage medium of claim 14 wherein the speed threshold comprises a variable speed threshold.

18. The non-transitory computer readable storage medium of claim 17 wherein the variable speed threshold is proportional to a voltage of the traction battery.

\* \* \* \* \*

UNITED STATES PATENT AND TRADEMARK OFFICE
CERTIFICATE OF CORRECTION

| | |
|---|---|
| PATENT NO. | : 11,462,920 B2 |
| APPLICATION NO. | : 16/778851 |
| DATED | : October 4, 2022 |
| INVENTOR(S) | : Xiaoyan Wang |

It is certified that error appears in the above-identified patent and that said Letters Patent is hereby corrected as shown below:

In the Claims

Column 10, Lines 16-17, and Claim 1:
After "active short circuit condition, and wherein"
Delete "and"

Signed and Sealed this
Fifth Day of March, 2024

Katherine Kelly Vidal
*Director of the United States Patent and Trademark Office*